United States Patent [19]

Kojo

[11] 4,137,668
[45] Feb. 6, 1979

[54] FLOWER-POT

[76] Inventor: Dairoku Kojo, 3-2-6-402, Chishirodai Minami, Chiba City, Chiba Prefecture, Japan

[21] Appl. No.: 844,865

[22] Filed: Oct. 25, 1977

[51] Int. Cl.² ............................................. A01G 9/02
[52] U.S. Cl. ......................................... 47/66; 47/67; 47/71
[58] Field of Search ............... 47/66, 67, 68, 69, 70, 47/71, 72, 79, 80, 81

[56] References Cited

U.S. PATENT DOCUMENTS

| | | | |
|---|---|---|---|
| 112,748 | 3/1871 | Stigale | 47/68 |
| 905,238 | 12/1908 | Schaffer | 47/66 |
| 1,375,333 | 4/1921 | Straub | 47/66 |
| 1,420,191 | 6/1922 | Hassig | 47/66 |

FOREIGN PATENT DOCUMENTS

| | | | |
|---|---|---|---|
| 542108 | 11/1955 | Belgium | 47/66 |
| 66660 | 6/1892 | Fed. Rep. of Germany | 47/67 |
| 445204 | 11/1912 | France | 47/67 |
| 1170322 | 1/1959 | France | 47/71 |

*Primary Examiner*—Edgar S. Burr
*Assistant Examiner*—James R. Feyrer
*Attorney, Agent, or Firm*—Frank J. Jordan

[57] ABSTRACT

A hanging flower-pot comprises a body portion for receiving soil and a bowl portion detachably connected to the body portion for receiving excess water, said bowl portion being adapted to be mounted on the body portion from a forward direction thereto without any rotation.

2 Claims, 13 Drawing Figures

FLOWER-POT

DETAILED DESCRIPTION

The present invention relates to a hanging flower-pot comprising a body portion for receiving soil and a bowl portion detachably connected to the body portion for receiving excess water.

Hanging flower-pots of the above type are known in the prior art, for example, by French Pat. No. 1,170,322 to M. Zoccolo. The applicant also has proposed an improved flower-pot of the above type by U.S. Patent application Ser. No. 739,376 filed on Nov. 5, 1976.

In these flower-pots, the bowl must be rotated with respect to the body to connect the bowl thereto. Particularly, the flower-pot previously proposed by the applicant has a flat surface which is adapted to contact any vertical flat wall upon hanging therefrom so that the bowl can be rotated with respect to the body only when the flower-pot is removed from the vertical wall.

It is therefore an object of the present invention to provide a hanging flower-pot of the above type in which the bowl can be easily mounted and demounted on and from the body without any rotation.

According to the present invention, the bowl portion of the flower-pot can be mounted on the body portion thereof by sliding toward the body from a foreward direction thereto. The bowl portion can be similarly removed from the body portion by sliding the bowl in a reverse direction without removing the body portion from any vertical wall.

The present invention will now be described by way of example with reference to the accompanying drawings in which.

Figure 1:
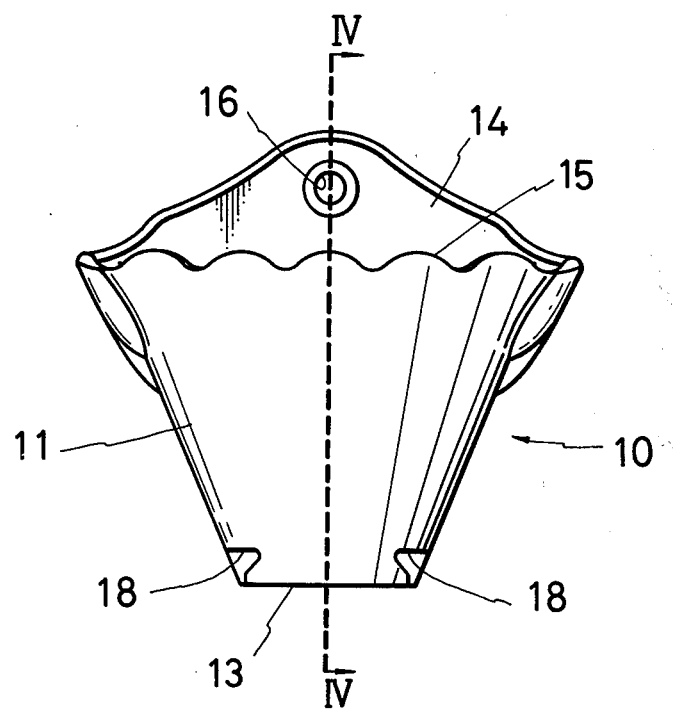
FIG. 1 is a front view of the body portion in a flower-pot according to the present invention.
Figure 2:
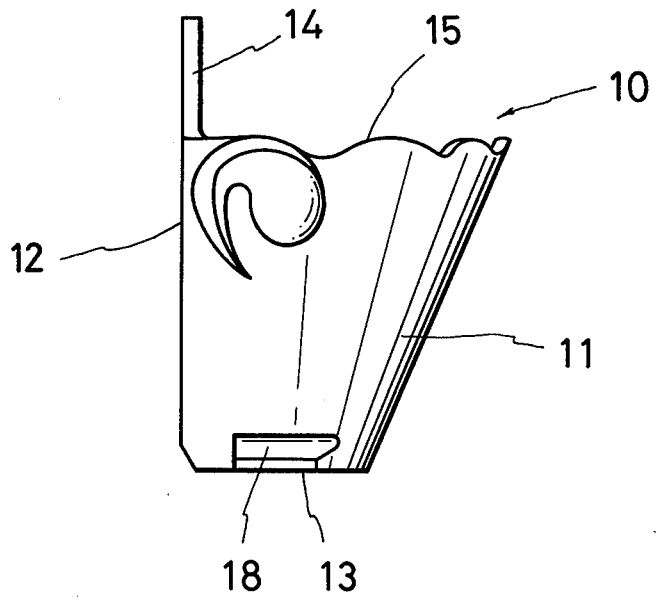
FIG. 2 is a side view of the body portion in FIG. 1.

Referring to FIGS. 1 through 4, a flower-pot according to the present invention includes a body portion 10 for receiving soil which is consisted of a forward curved wall 11, a rearward flat wall 12 and a bottom wall 13. These walls 11, 12 and 13 are connected integrally with one another to form a receptacle having its flared top opening. The rearward wall 12 has an extension 14 positioned above the upper edge 15 of the forward wall 11 and having an aperture 16 for hanging the flower-pot from any vertical wall. The bottom wall 13 has also an aperture for draining excess water from the body portion 10.

Figure 3:
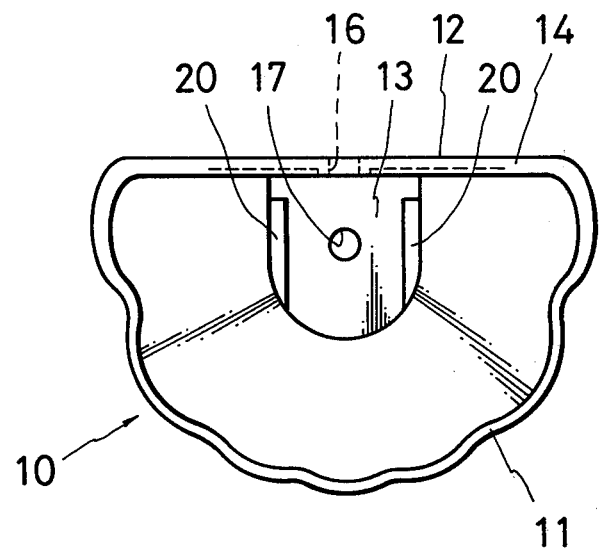
FIG. 3 is a plan view of the body portion in FIG. 1.
Figure 4:
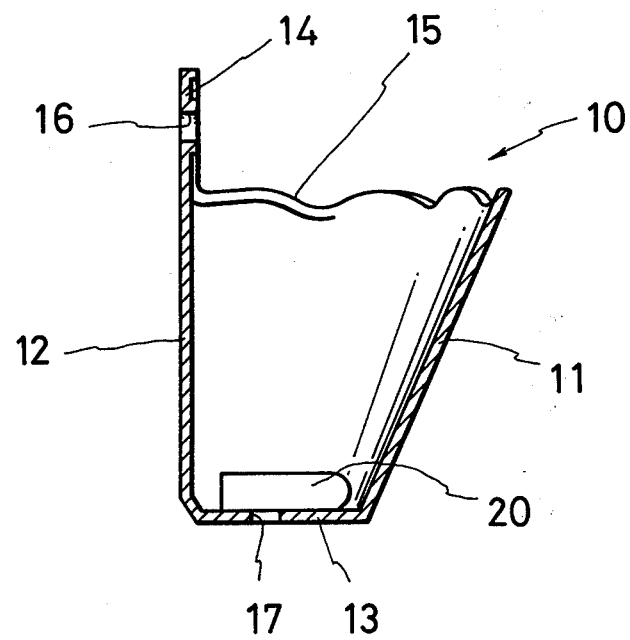
FIG. 4 is a sectional view taken along a line 4—4 in FIG. 1.
Figure 5:
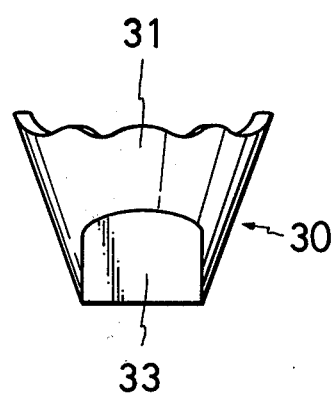
FIG. 5 is a front view of a bowl portion to be mounted on the body portion shown in FIG. 1.
Figure 6:
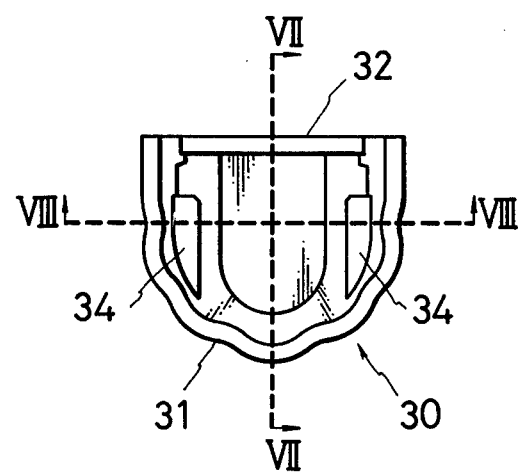
FIG. 6 is a plan view of the bowl portion shown in FIG. 5.
Figure 7:
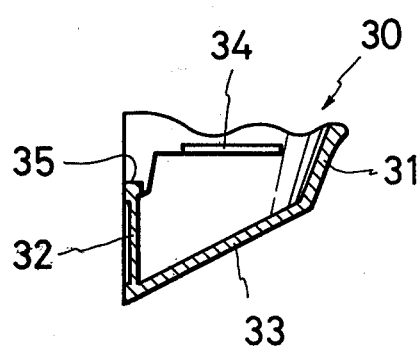
FIG. 7 is a sectional view taken along a line 7—7 in FIG. 6.
Figure 8:
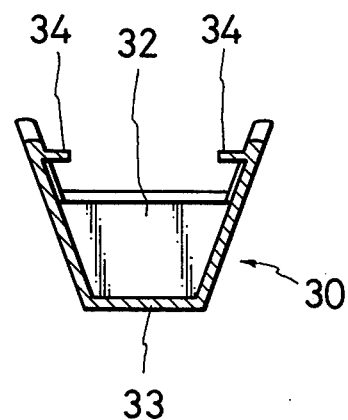
FIG. 8 is another sectional view taken along a line 8—8 in FIG. 6.

The forward curved wall 11 has a pair of grooves 18 formed on the external face thereof adjacent to the bottom wall 13 in the opposite side positions of the body portion 10. The grooves 18 extend substantially parallel to each other and a plane including the bottom wall 13 and substantially perpendicular to a plane including the rearward wall 12. Each of the grooves 18 has one end terminating at a position adjacent to the rearward wall 12 and the other end opened in a forward direction in the forward curved wall 11. By forming the grooves 18, ridges 20 are formed on the internal face of the forward wall 11 adjacent to the bottom wall 13 as shown in FIGS. 3 and 4.

A bowl portion 30 which is adapted to be mounted on the body portion 10 is illustrated in FIGS. 5 through 8. The bowl portion 30 similarly comprises a forward curved wall 31, a rearward flat wall 32 and a bottom wall 33. These walls 31, 32 and 33 are connected integrally with one another to form a container with its top opening. The forward wall 31 has its internal curvature substantially corresponding to the external curvature in the forward wall 11 of the body portion 10.

A pair of plate-like protrusions 34 are formed on the internal side faces of the forward wall 31 adjacent to the upper edge thereof and extend parallel to each other with the ends terminating adjacent to the rearward wall 32 of the bowl portion 30.

The rearward wall 32 has its upper edge 35 positioned below the protrusions 34 so that the bowl portion 30 can be mounted on the body portion 10 by sliding the protrusions 34 of the bowl portion 30 into the grooves 18 of the body portions 10 as described hereinafter.

Figure 9:
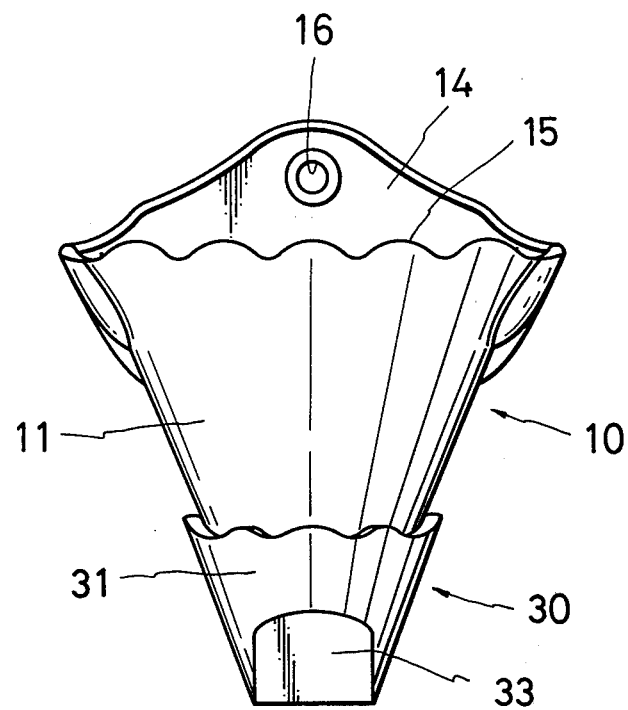
FIG. 9 is a front view of the flower-pot in which the bowl portion is mounted on the body portion.
Figure 10:
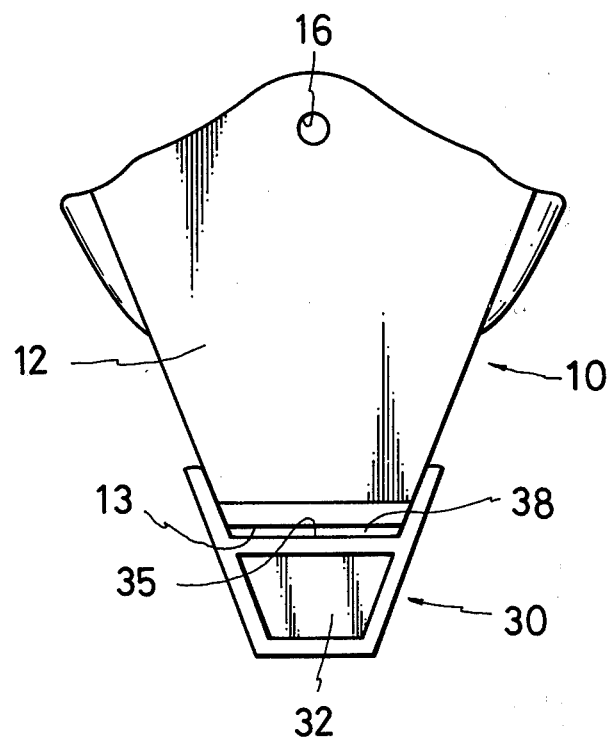
FIG. 10 is a rear view of the flower-pot shown in FIG. 9.
Figure 11:
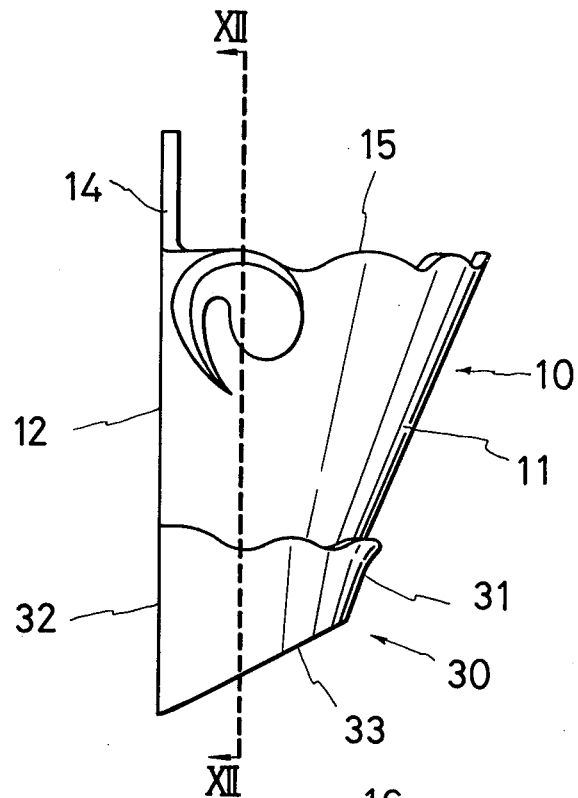
FIG. 11 is a side view of the flower-pot in FIG. 9.
Figure 12:
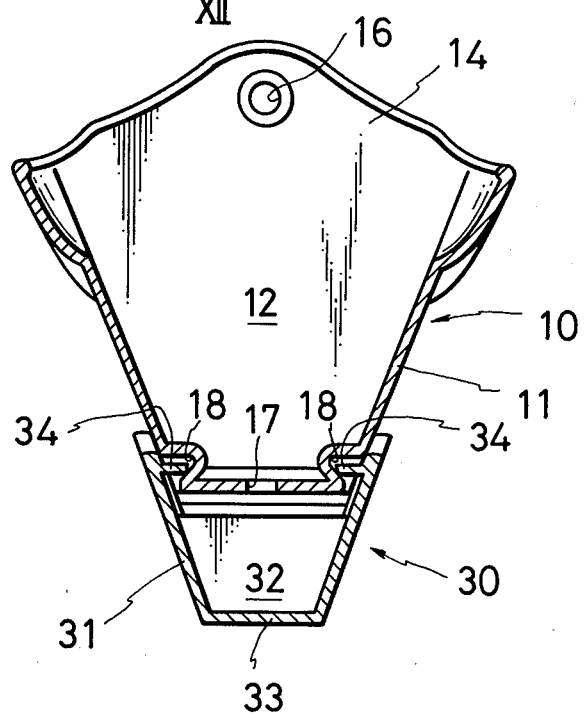
FIG. 12 is a sectional view taken along a line 12—12 in FIG. 11.

The bowl portion 30 is mounted on the body portion 10 by engaging the protrusions 34 of the bowl 30 with the grooves 18 of the body 10 and sliding the bowl 30 toward the body 10. As best seen from FIG. 12, the bowl 30 is supported on the body 10 by the protrusions 34 thereof which are engaged by the grooves 18 of the body 10. When the bowl 30 is mounted on the body 10, the forward wall 11 of the body 10 is partially covered by the upper section of the bowl 30 as shown in FIGS. 9 and 11 and the upper edge 35 of the bowl 30 is positioned slightly below the bottom wall 13 of the body 10 to form a slit 38 therebetween as shown in FIG. 10. This slit 38 serves as a vent for communicating the interior of the bowl 30 with atmosphere.

Thus, the bowl 30 can be easily mounted on the body 10 from a forward direction thereto without any rotation even if the body 10 is hung from any vertical flat wall. The removal of the bowl 30 is easily attained by sliding it away from the body in a reverse direction.

Figure 13:
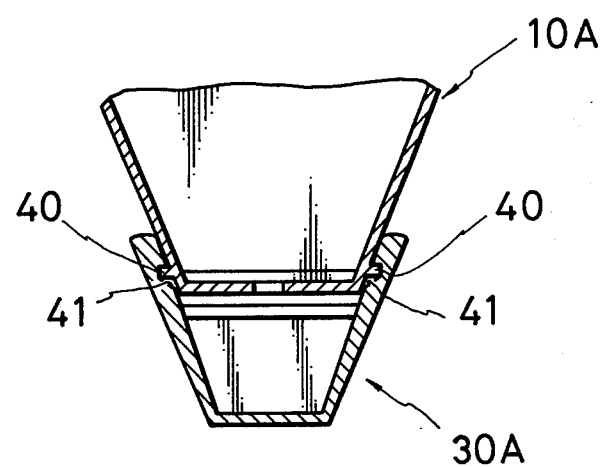
FIG. 13 is a fragmental view similar to FIG. 12 showing another embodiment of the present invention.

FIG. 13 shows another embodiment of the present invention in which a body portion 10A has a pair of protrusions 40 similar to the protrusions 34 and a bowl portion 30A has a pair of grooves 41 similar to the grooves 18. The bowl portion 30A can be similarly mounted and demounted on and from the body portion 10A without need of any rotation of the bowl portion 30A.

I claim:

1. A hanging flower-pot comprising in combination a body portion consisted of a forward curved wall, a rearward flat wall and a bottom wall, which walls are connected integrally with one another to form a receptacle having its top opening, said rearward flat wall having an extension protruding above the top edge of said receptacle and formed with an aperture for hanging said flower-pot on any vertical wall, said bottom wall having also an aperture formed therethrough, said body portion having a pair of opposed grooves which are formed on the external side faces of said forward wall adjacent to said bottom wall and extend substantially parallel to each other and substantially perpendicular to a plane including said rearward wall, each of said grooves having one end terminating at a position adjacent to the rearward wall of said body portion and the other end opened forward; and a bowl portion consisted of a forward curved wall having an internal curvature substantially corresponding to the external curvature in the forward wall of said body portion, a rearward flat wall and a bottom wall, which walls are connected integrally with one another to form a container having its top opening, the forward wall of said bowl portion having its internal side faces formed with a pair of opposed protrusions at positions corresponding to that of said grooves of said body portion, said protrusions extending substantially parallel to each other adjacent to the upper edge of said bowl portion, the height of said rearward wall in said bowl portion being such that the upper edge thereof terminates slightly below the bottom wall of said body portion when said bowl portion is mounted on said body portion, whereby said bowl portion can be mounted on said body portion from a forward direction thereto without any rotation.

2. A hanging flower-pot comprising in combination a body portion consisted of a forward curved wall, a rearward flat wall and a bottom wall, which walls are connected integrally with one enother to form a receptacle haivng its top opening, said rearward flat wall having an extension protruding above the top edge of said receptacle and formed with an aperture for hanging said flower-pot on any vertical wall, said bottom wall having also an aperture formed therethrough, said body portion having a pair of opposed protrusions which are formed on the external side faces of said forward wall adjacent to said bottom wall and extending substantially parallel to each other and substantially perpendicular to a plane including said rearward wall, each of said protrusions having one end terminating at a position adjacent to the rearward wall of said body portion and the other end terminating at the front face of said forward wall; and a bowl portion consisted of a forward curved wall having an internal curvature substantially corresponding to the external curvature in the forward wall of said body portion, a rearward flat wall and a bottom wall, which walls are connected integrally with one another to form a container having its top opening, the forward wall of said bowl portion having its internal side faces formed with a pair of opposed grooves at positions corresponding to that of said protrusions of said body portion, said grooves extending substantially parallel to each other adjacent to the upper edge of said bowl portion, the height of said rearward wall in said bowl portion being such that the upper edge thereof terminates slightly below the bottom wall of said body portion when said bowl portion is mounted on said body portion, whereby said bowl portion can be mounted on said body portion from a forward direction thereto without any rotation.

* * * * *